United States Patent
Watanabe

(10) Patent No.: US 9,204,059 B2
(45) Date of Patent: Dec. 1, 2015

(54) IMAGE PROCESSING APPARATUS HAVING FUNCTION OF READING CAPTURED IMAGE, CONTROL METHOD THEREOF, AND IMAGING APPARATUS

(71) Applicant: CANON KABUSHIKI KAISHA, Tokyo (JP)

(72) Inventor: Takeshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/722,047

(22) Filed: Dec. 20, 2012

(65) Prior Publication Data
US 2013/0162868 A1 Jun. 27, 2013

(30) Foreign Application Priority Data
Dec. 27, 2011 (JP) .................................. 2011-286632

(51) Int. Cl.
H04N 5/262 (2006.01)
H04N 5/222 (2006.01)
H04N 5/232 (2006.01)

(52) U.S. Cl.
CPC ........... *H04N 5/262* (2013.01); *H04N 5/23248* (2013.01); *H04N 5/23296* (2013.01)

(58) Field of Classification Search
CPC .......... H04N 5/23293; H04N 5/23296; H04N 5/2628; H04N 5/232
USPC .......... 348/358, 240, 333.03, 231.99, 240.99, 348/240.1–240.3, 352, 208.13
See application file for complete search history.

(56) References Cited

U.S. PATENT DOCUMENTS

| | | | |
|---|---|---|---|
| 6,765,587 B1* | 7/2004 | Zhang et al. | 345/606 |
| 7,783,096 B2* | 8/2010 | Chen et al. | 382/128 |
| 2001/0022619 A1* | 9/2001 | Nishiwaki | 348/208 |
| 2004/0095485 A1* | 5/2004 | Ueda et al. | 348/240.1 |
| 2005/0105924 A1* | 5/2005 | Suzuki et al. | 399/45 |
| 2006/0171703 A1* | 8/2006 | Abe et al. | 396/311 |
| 2007/0146529 A1* | 6/2007 | Suzuki | 348/333.01 |
| 2008/0012963 A1* | 1/2008 | Nanjo et al. | 348/240.99 |
| 2008/0204587 A1* | 8/2008 | Takahara et al. | 348/333.01 |
| 2012/0092525 A1* | 4/2012 | Kusaka | 348/231.99 |

FOREIGN PATENT DOCUMENTS

| | | |
|---|---|---|
| JP | 2007-060486 | 3/2007 |
| JP | 2011-114794 | 6/2011 |

* cited by examiner

*Primary Examiner* — Sinh Tran
*Assistant Examiner* — Xi Wang
(74) *Attorney, Agent, or Firm* — Cowan, Liebowitz & Latman, P.C.

(57) ABSTRACT

During a zoom operation of an imaging optical system, a read position is decided in units of less than one pixel and set sequentially. Also, when the zoom operation has stopped, the read position is moved so to be an integer multiple of one pixel, if the read position at the time when the zoom operation stopped is not an integer multiple of one pixel. Smooth image display during zoom operation and suppression of sharpness reduction in an image displayed when zooming has stopped are thereby both achieved, in an image processing apparatus that controls the read position of a captured image according to a zoom position of the imaging optical system and a control method thereof.

11 Claims, 8 Drawing Sheets

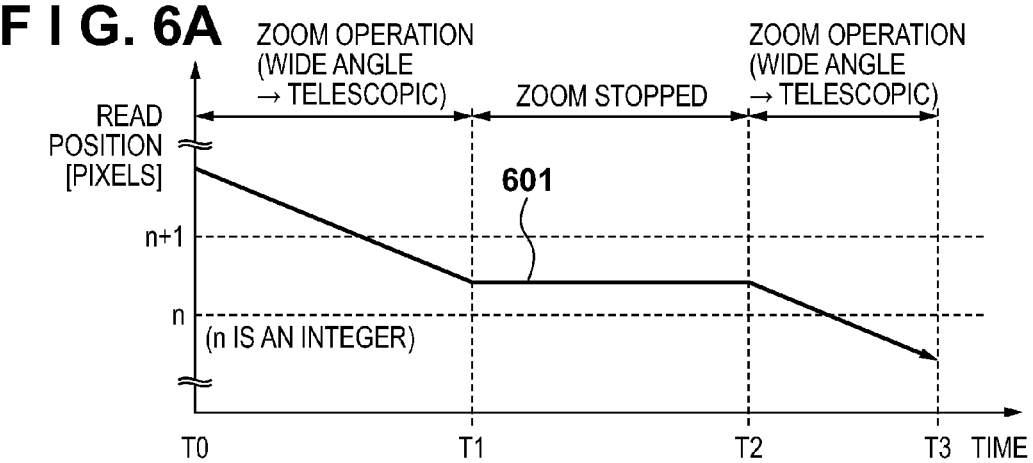
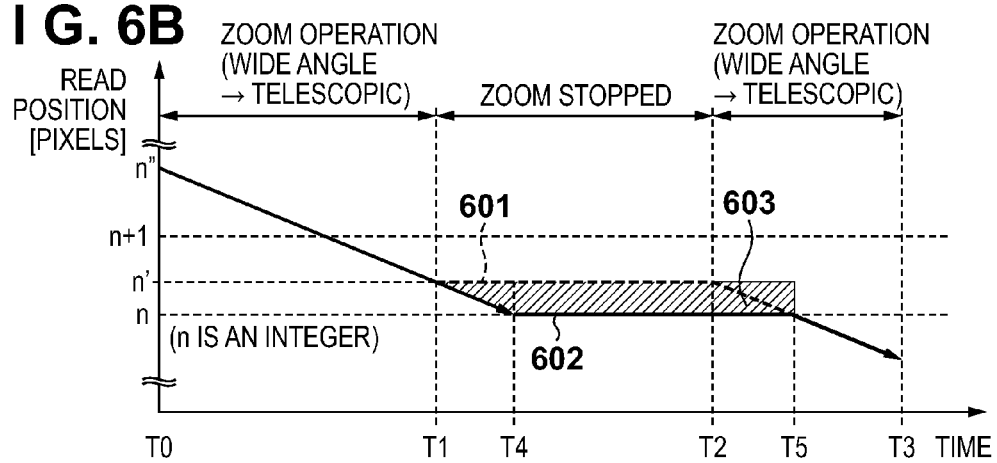
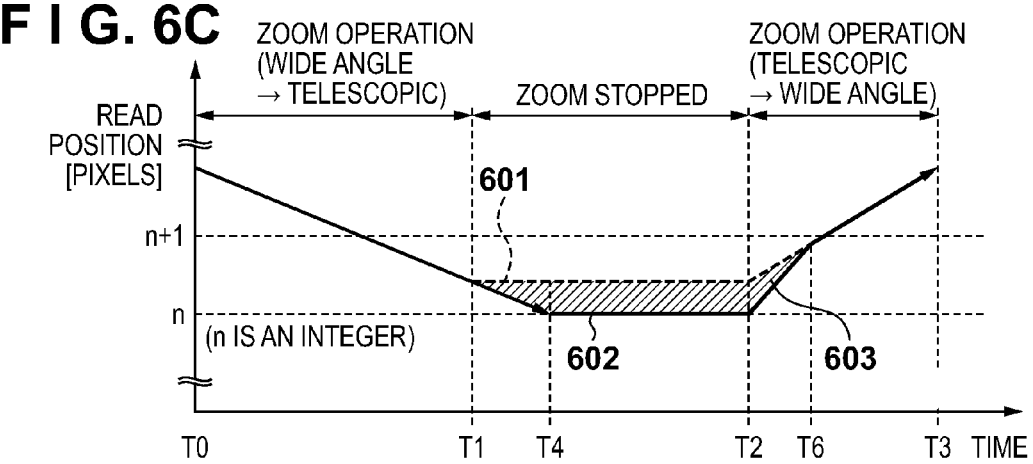

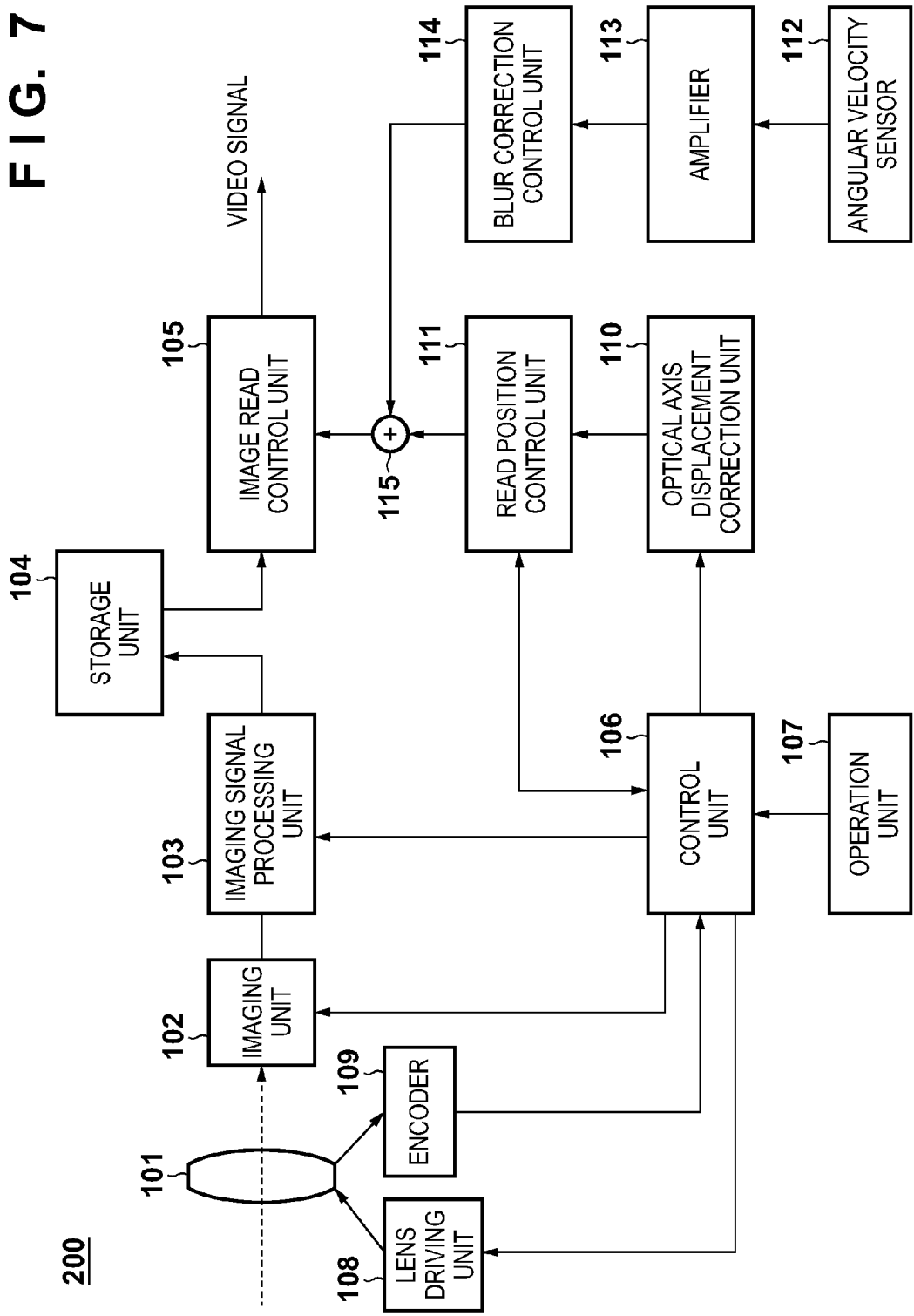

IMAGE PROCESSING APPARATUS HAVING FUNCTION OF READING CAPTURED IMAGE, CONTROL METHOD THEREOF, AND IMAGING APPARATUS

BACKGROUND

1. Field of the Disclosure

The present disclosure relates to an image processing apparatus having a function of reading a captured image, a control method thereof, and an imaging apparatus.

2. Description of the Related Art

The optical axis and the center of the image sensor may be misaligned due to factors such as assembly error when assembling the imaging lens or attachment error when attaching the image sensor. Misalignment of this center position (hereinafter referred to as optical axis displacement) fluctuates in accordance with movement of the focal lens and the magnification lens. Japanese Patent Laid-Open No. 2007-60486 and Japanese Patent Laid-Open No. 2011-114794 disclose cameras that adjust the readout position of pixels on the image sensor so that the position on the optical axis at which an image of the object is formed does not move when the moveable lens group moves, such as during focus detection, zooming and the like.

In an imaging apparatus provided with a zoom (magnification) lens, such as Japanese Patent Laid-Open No. 2007-60486 and Japanese Patent Laid-Open No. 2011-114794, the following problems arise in the case where optical axis misalignment is corrected by changing the image read position according to the zoom position (magnification ratio).

To correct optical axis misalignment that differs depending on the zoom position, the image read position needs to be changed sequentially during the zoom operation. However, in the case of changing the read position sequentially during the zoom operation when the smallest unit of this read position is one pixel, the change in read position will be perceived by the user as instability on the screen or blurring on the screen, and appear unnatural. This problem can be suppressed by changing the read position in units sufficiently smaller than one pixel. In this case, the image of a read position corresponding to pixel positions having values of less than one pixel is generated by interpolating actual pixel values (of pixel positions that are an integer multiple of one pixel). For example, the pixel value corresponding to an intermediate position $(1.5, 1)$ of the two pixels $(x, y)=(1, 1)$ and $(2, 1)$ adjacent in the x direction in an xy orthogonal coordinate system can be derived as the average value of the pixel value of $(1, 1)$ and the pixel value of $(2, 1)$. Note that this interpolation method is merely an example, and other interpolation methods may be used.

Thus, in the case of generating an image corresponding to the read position in units of less than one pixel by interpolation, the image of the read position corresponding to the zoom position at the time when the zoom operation stops may be an interpolated image. Since an interpolated image is an image constituted by pixel values estimated by interpolation, there is a problem in that sharpness decreases as compared with a clipped image that does not require interpolation.

SUMMARY

The present disclosure provides both smooth image display during zoom operation and suppression of sharpness reduction in an image displayed when zooming has stopped, in an image processing apparatus that controls the read position of an image according to a zoom position of the imaging optical system and a control method thereof.

According to an aspect of the present invention, there is provided an image processing apparatus comprising: an obtaining unit that obtains a captured image composed of a plurality of pixels that is obtained by capturing an optical image formed by an imaging optical system having a variable zoom ratio; an image sensing unit that generates an image of predetermined size from a preset read range of the captured image; a calculating unit that calculates a region in which the read range is movable or a center position of the region in which the read range is movable, according to a zoom operation of the imaging optical system; and a setting unit that sets the region or the center position calculated by the calculating unit in units of less than one pixel during a zoom operation of the imaging optical system and in integer multiples of one pixel when the zoom operation has stopped.

According to another aspect of the present invention, there is provided an imaging apparatus comprising: an imaging optical system having a variable zoom ratio; an imaging unit that obtains a captured image composed of a plurality of pixels that is obtained by capturing an optical image formed by the imaging optical system; and the image processing apparatus according to the present disclosure.

According to further aspect of the present invention, there is provided an imaging apparatus comprising: an imaging unit that captures an image composed of a plurality of pixels that is obtained by capturing an optical image formed by an imaging optical system having a variable zoom ratio; an image sensing unit that generates an image of predetermined size from a preset read range of the captured image; a calculating unit that calculates a region in which the read range is movable or a center position of the region in which the read range is movable, according to a zoom operation of the imaging optical system; and a setting unit that sets the region or the center position calculated by the calculating unit in units of less than one pixel during a zoom operation of the imaging optical system and in integer multiples of one pixel when the zoom operation has stopped.

According to yet further aspect of the present invention, there is provided a control method of an image processing apparatus comprising: an obtaining step of obtaining a captured image composed of a plurality of pixels that is obtained by capturing an optical image formed by an imaging optical system having a variable zoom ratio; an image sensing step of generating an image of predetermined size from a preset read range of the captured image; a calculation step of calculating a region in which the read range is movable or a center position of the region in which the read range is movable, according to a zoom operation of the imaging optical system; and a setting step of setting the region or the center position calculated by the calculating step in units of less than one pixel during a zoom operation of the imaging optical system and in integer multiples of one pixel when the zoom operation has stopped.

Further features of the present disclosure will become apparent from the following description of exemplary embodiments with reference to the attached drawings.

BRIEF DESCRIPTION OF THE DRAWINGS

FIG. 6A to FIG. 6C are diagrams illustrating the relationship between target position and decided read position in a sequence of zoom operation, zoom operation stop and zoom operation resume.

FIG. 7 is a block diagram showing an exemplary configuration of a digital camcorder serving as an exemplary imaging apparatus according to a second embodiment.

DESCRIPTION OF THE EMBODIMENTS

Exemplary embodiments will now be described in detail in accordance with the accompanying drawings. Note that while a digital camcorder serving as an exemplary image processing apparatus according to embodiments will now be described, the configuration related to imaging such as the imaging optical system and the image sensor is not considered essential. The present disclosure is applicable to an arbitrary imaging apparatus having a moving image capture function as well as to an arbitrary electronic device capable of obtaining information relating to zooming of an imaging optical system. An imaging apparatus as referred to here also includes devices in which an imaging apparatus is integrated or built in, such as a mobile phone, game machine or personal computer with built-in camera.

Overall Configuration Imaging Apparatus

Figure 1:
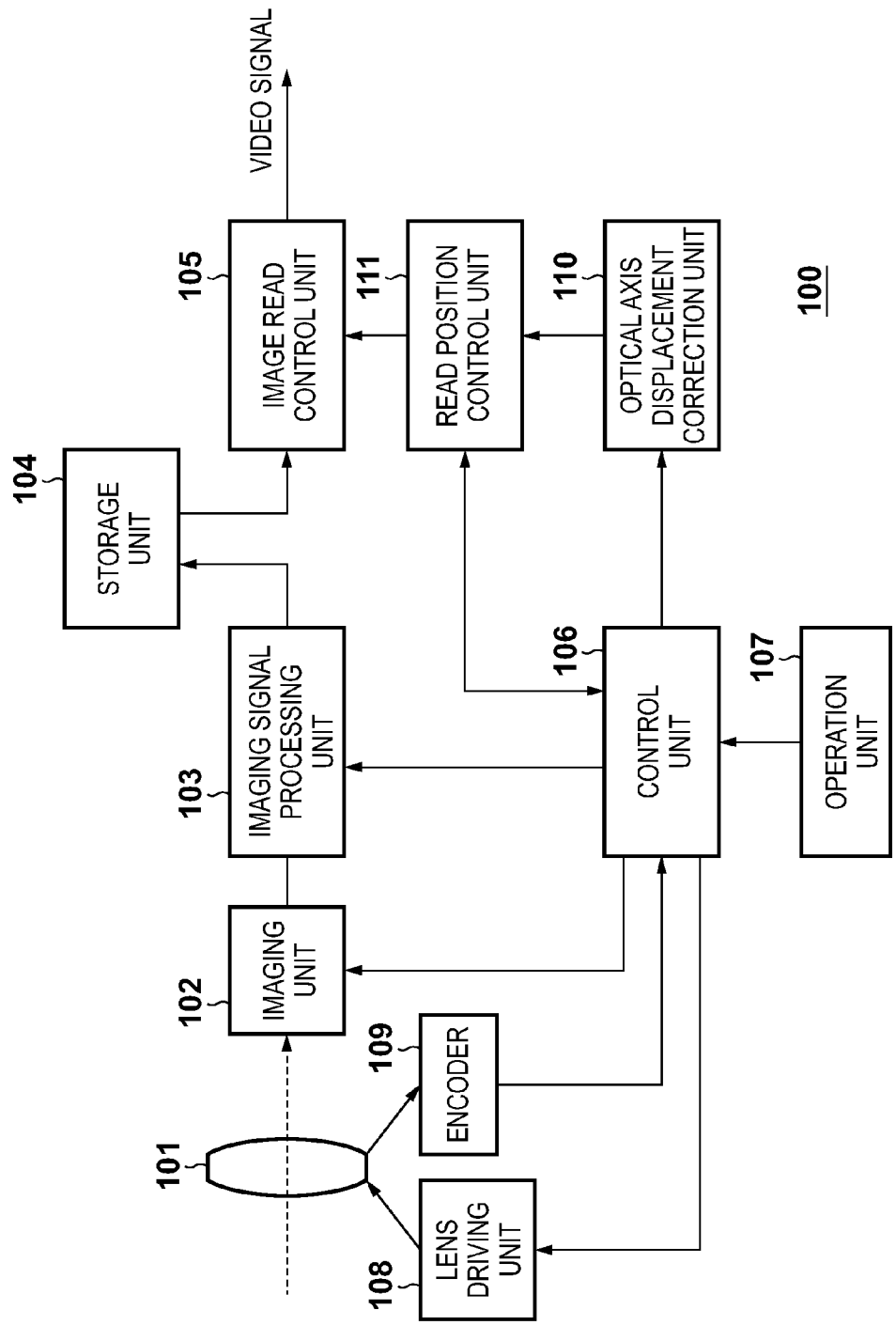
FIG. 1 is a block diagram showing an exemplary configuration of a digital camcorder serving as an example of an imaging apparatus according to a first embodiment.

FIG. 1 is a block diagram showing an exemplary configuration of a digital camcorder 100 according to a first embodiment. In FIG. 1, an imaging optical system 101 forms an optical image of an object on an imaging surface of an image sensor provided in the digital camcorder 100. The imaging optical system 101 is a zoom lens with a variable magnification ratio. An imaging unit 102 uses the image sensor to perform photoelectric conversion on the optical image formed by the imaging optical system 101, and supplies an image signal representing the captured image composed of a plurality of pixels to an imaging signal processing unit 103.

The imaging signal processing unit 103 performs known signal processing such as gain adjustment, color balance adjustment and gamma correction on the image signal output from the imaging unit 102, and temporarily stores the resultant signal in a storage unit 104. A memory read control unit 105 outputs an image signal corresponding to an arbitrary region (read region) set by a read position control unit 111, among image signals temporarily stored in the storage unit 104. In the case where the coordinates of the region set by the read position control unit 111 are designated in units smaller than one pixel, the memory read control unit 105 performs interpolation processing, and generates and outputs an image signal corresponding to the set read region. If interpolation is not required, the memory read control unit 105 reads out the image signal corresponding to the read region and outputs the read signal without performing interpolation. Interpolation processing will be described in detail later.

A control unit 106 controls the overall operations of the digital camcorder 100. The control unit 106 is, for example, a CPU, and realizes various operations including an optical axis misalignment correction operation which will be discussed later, by loading control programs stored in a nonvolatile storage device such as ROM into a memory such as RAM, and executing the loaded programs. Note that at least part of the processing ascribed to the control unit 106 may be executed by hardware such as an ASIC or an electronic circuit.

The control unit 106 outputs a control signal to a lens driving unit 108 according to a user operation from an operation unit 107. The lens driving unit 108 drives a magnification lens group that changes the magnification ratio of the imaging optical system 101 in the optical axis direction according to the control signal, and changes the magnification ratio of the imaging optical system 101. An encoder 109 detects the position (zoom ratio) of the magnification lens group, and outputs a zoom position signal to the control unit 106. The zoom position signal is provided to an optical axis misalignment correction unit 110 from the control unit 106. Note that the zoom position signal may be provided directly to the optical axis misalignment correction unit 110 from the encoder 109.

The optical axis misalignment correction unit 110 calculates a read target position for correcting optical axis misalignment that depends on the zoom position indicated by the zoom position signal, and outputs the calculated position to the read position control unit 111. In other words, misalignment between the optical axis and the center of the image sensor is rectified by changing the read range of an image. Specifically, the region in which the read range of electronic image shake correction can move or the center position of the region in which the read range can move is changed, for example. In other words, the misalignment optical axis misalignment correction unit 110 for correcting misalignment of this center position calculates, as the read target position, the region in which the read range can move or the center position of the region in which the read range can move, according to the zoom operation of the imaging optical system. The read position control unit 111 decides the actual read position from the read target position, according to whether the imaging optical system 101 is currently performing the zoom operation, and sets the decided position in the memory read control unit 105. At least one of the optical axis misalignment correction unit 110 and the read position control unit 111 may be realized with software by the control unit 106.

Read and Pixel Interpolation Processing

Figure 2:
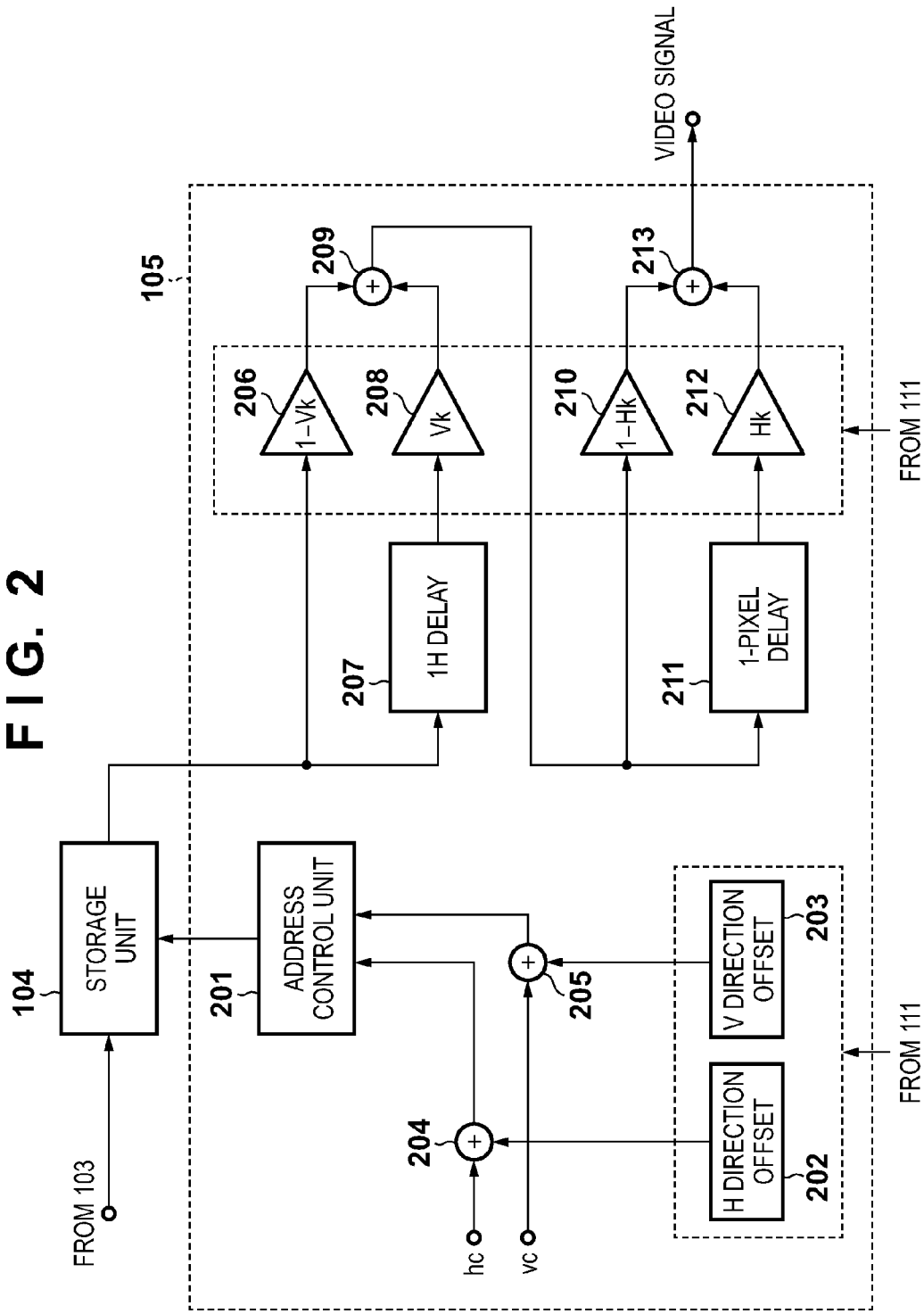
FIG. 2 is a block diagram showing an exemplary configuration of a read unit in FIG. 1.

FIG. 2 is a block diagram showing an exemplary configuration of the memory read control unit 105. Hereafter, read processing and pixel interpolation processing performed by the memory read control unit 105 will be described in detail with reference to FIG. 2. As described previously, image signals are temporarily stored in the storage unit 104, and the image signals of pixels included in an arbitrary region, among pixels constituting a captured image, can be read out by controlling the readout address of the storage unit 104.

hc (H count value) representing the horizontal coordinates of the image and vc (V count value) representing the vertical coordinates of the image are input to an address control unit 201. The address control unit 201 converts the H count value and the V count value into an address in the storage unit 104, and reads out the image signal of the pixel at the position specified by the combination of the H count value and the V count value. Here, (H count value, Y count value)=(0, 0) corresponds to the upper left pixel of the captured image, and respective coordinates are assumed to move in the rightward (horizontal) direction of the image when the H count value increases and in the downward (vertical) direction of the image when the Y count value increases. Also, with regard to the readout order, one line of pixels is sequentially read out in the horizontal direction, and when completed, the H count value is cleared to zero and one is added to the V count value, after which pixels are read out from the start of the next line. The H count values and V count values can be sequentially supplied by the control unit 106 from the start of pixel readout.

Also, the readout start address (read position) can be set in integer multiples of one pixel by adding a prescribed offset to the H count value and the V count value. Because the H count value is input to the address control unit 201 after being added to an H direction offset 202 by an adder 204, readout of image signals can be started from a horizontal position that depends on the H direction offset 202. Similarly, because the V count value is input to the address control unit 201 after being added to a vertical direction offset 203 by an adder 205, readout of image signals can be started from a vertical position that depends on the vertical direction offset 203. The read position control unit 111 sets the read position, by setting the H direction offset 202 and the V direction offset 203 corresponding to the decided read position (origin of read region) in the memory read control unit 105.

Note that the read position control unit 111 may also set the horizontal and vertical readout end coordinates directly. However, since the size (Hw, Yw) of the read region is determined in advance according to the display resolution and the like, appropriate readout can be realized by the constituent element (e.g., control unit 106) that supplies the H count value and the Y count value controlling the clearing of the H count value and the incrementing of the Y count value. Specifically, when the H count value equals Hw, the next H count value is cleared to zero and one is added to the Y count value. Also, when the H count value equals Hw and the Y count value equals Yw, readout is ended without supplying the next count values.

Note that since the method of reading out image signals corresponding to an arbitrary rectangular region from a captured image is not particularly restricted, and arbitrary methods that have conventionally been employed can be utilized, further description is omitted.

The image signals read sequentially from the storage unit 104 are applied to a coefficient (1−Vk) multiplier 206 and a 1H delay circuit 207, and the output of the 1H delay circuit is applied to a coefficient Vk multiplier 208. An adder 209 adds the output of the multiplier 206 and the output of the multiplier 208. That is, the output of the adder 209 is a value obtained by weight-averaging the image signals of vertically adjacent pixels with the weight of a coefficient Vk. The coefficient Vk can take a value from 0 to 1 inclusive, and pixel values corresponding to coordinates of less than one pixel in the vertical direction can be derived using a coefficient Vk that is greater than 0 and less than 1. If coefficient Vk=0, the adder 209 outputs the image signals of the current line directly. This is a state where vertical pixel interpolation is not performed. Also, if coefficient Vk=0.5, the adder 209 outputs the average values of the image signals of pixels on the current line and the image signals of pixels on the next (lower) line. This results in the pixel signals of pixels in positions shifted by 0.5 pixels in the vertical direction (downward direction). The pixel values of coordinates nearer to the next line are thus obtained as the coefficient Vk approaches 1. The read position can thus be changed by one pixel or less in the vertical direction.

The image signals output from the adder 209 are applied to a coefficient (1−Hk) multiplier 210 and a 1-pixel delay circuit 211, and the output of the 1-pixel delay circuit 211 is applied to a coefficient Hk multiplier 212. An adder 213 adds the output of the multiplier 210 and the output of the multiplier 212. That is, the output of the adder 213 is a value obtained by weight-averaging horizontally adjacent image signals with the weight of a coefficient Hk. Similarly to the vertical direction, the coefficient Hk can take a value of 0 to 1 inclusive, and pixel values corresponding to coordinates of less than one pixel in the horizontal direction can be derived using a coefficient Hk that is greater than 0 and less than 1. If Hk=0, the adder 213 outputs the current image signals directly. This is a state where horizontal pixel interpolation is not performed. Also, if coefficient Hk=0.5, the adder 209 outputs the average value of the image signal of the current pixel and the image signal of the next (right) pixel in the horizontal direction. This results in the pixel signals of pixels in positions shifted by 0.5 pixels in the horizontal direction (rightward direction). The pixel values of coordinates nearer to the next pixel in the horizontal direction are thus obtained as the coefficient Hk approaches 1. The read position can thus be changed by one pixel or less in the horizontal direction.

Pixel values at coordinates of less than one pixel in both the horizontal and vertical directions can be computed by combining the coefficients Vk and Hk.

Optical Axis Misalignment Correction

Next, a method of deciding the center position of the imaging unit 102 (image sensor) and the read position for correcting misalignment (optical axis misalignment) with the optical axis of the imaging optical system 101 and the optical axis will be described with reference to FIGS. 3A and 3B and FIGS. 4A and 4B.

Figure 3A:
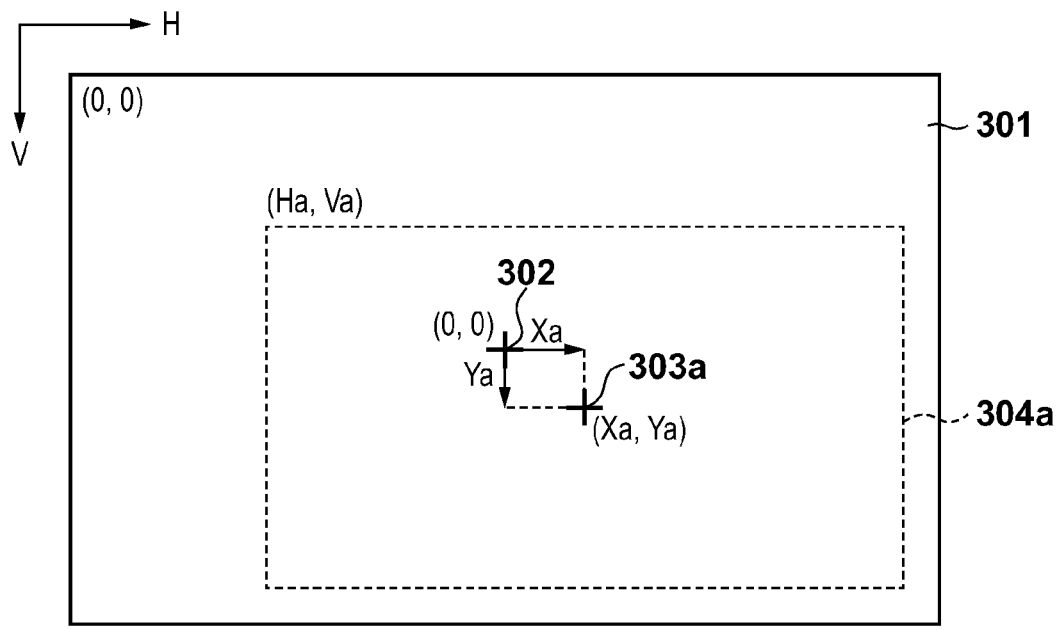
FIGS. 3A and 3B are diagrams showing examples of optical axis misalignment and read positions for correcting optical axis misalignment at a wide-angle end and a telephoto end.
Figure 3B:
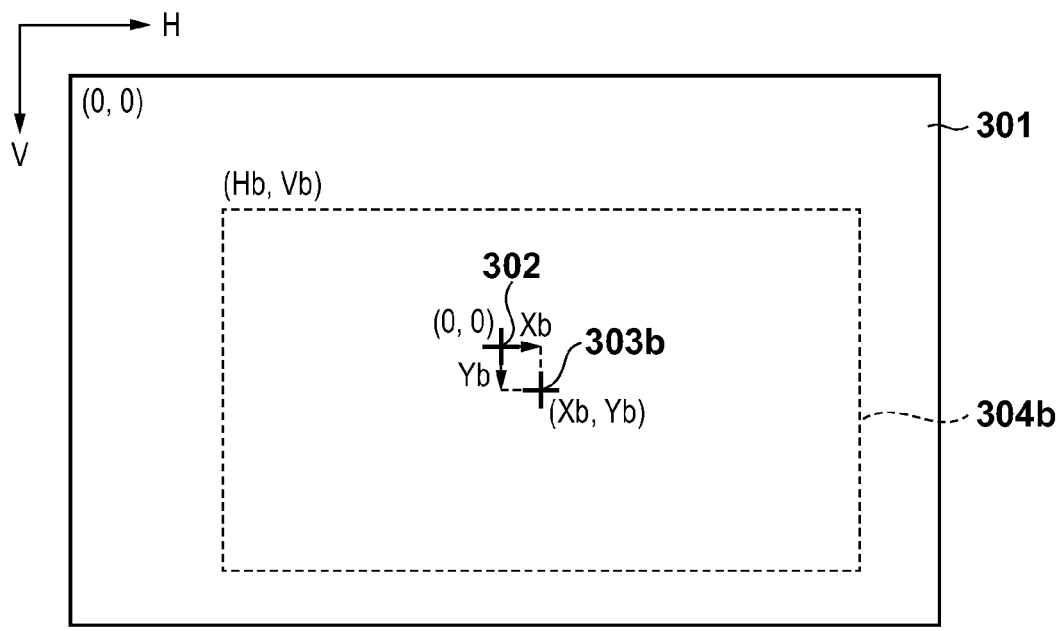

FIGS. 3A and 3B are diagrams showing an example of the relationship between the optical axis position of an optical image formed by the imaging unit 102, the center position of the image sensor, and the read position. Reference numeral 301 denotes an effective region of the imaging unit 102, and 302 denotes the center position of the effective region of the imaging unit 102. FIG. 3A shows the case where the angle of view of the imaging optical system 101, which is a zoom lens, is at the wide-angle end, and reference numeral 303a denotes the optical axis position. Optical axis misalignment is defined by the relative position of the optical axis 303a based on the center position 302 of the effective region, with horizontal optical axis misalignment being indicated by Xa and vertical optical axis misalignment being indicated by Ya. An image without optical axis misalignment is obtained by read and outputting the image signals of a region 304a centered on a position corresponding to the center of the optical axis from the effective region 301. The origin (read position) of the read range for correcting optical axis misalignment at the wide-angle end will be (Ha, Va) in the case where the upper left of the screen is the origin (0, 0).

On the other hand, FIG. 3B shows the case where the imaging optical system 101 is at the telephoto end. Optical axis misalignment in this case is Xb in the horizontal direction and Yb in the vertical direction, and the read position for correcting optical axis misalignment will be (Hb, Vb).

Optical axis misalignment at the wide-angle end and the telephoto end and the read position for correcting this misalignment are shown in FIGS. 3A and 3B, with the amount of optical axis misalignment differing between the wide-angle end and the telephoto end. In the examples in FIGS. 3A and 3B, Xa>Xb and Ya>Yb. Thus, the read position needs to be changed according to the zoom position, since correction cannot be performed correctly with the read positions shown in FIGS. 3A and 3B at intermediate positions between the wide-angle end and the telephoto end.

Figure 4A:
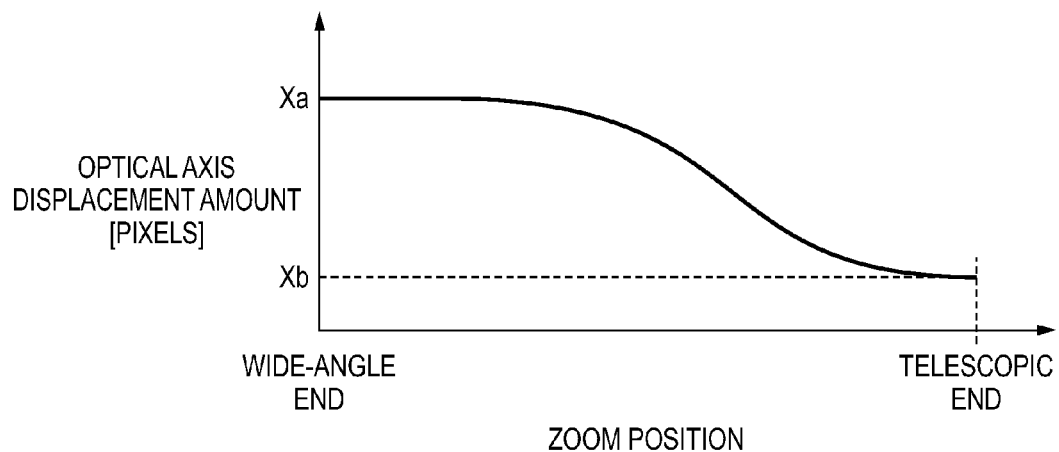
FIG. 4A is a diagram showing an exemplary relationship between zoom positions and optical axis misalignment.
Figure 4B:
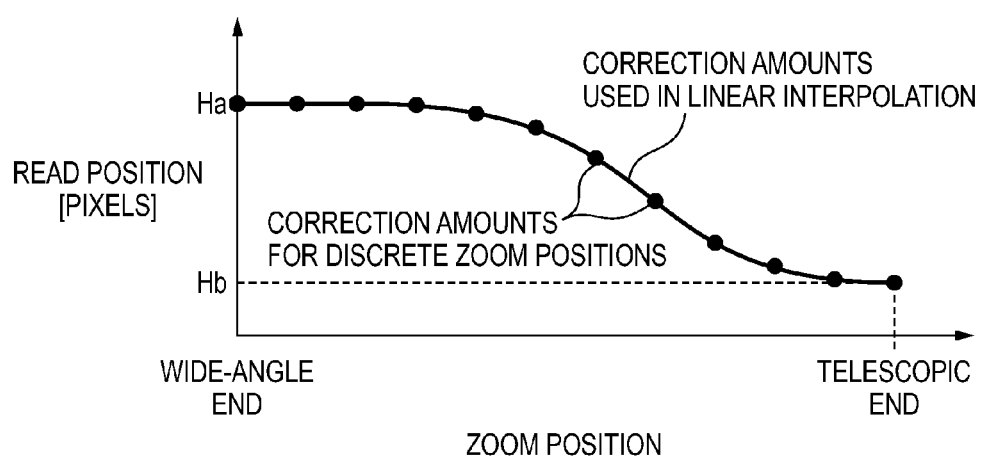
FIG. 4B is a diagram illustrating a method of storing zoom positions and corresponding correction amounts.

FIG. 4A is a diagram showing an example of the relationship between zoom positions and horizontal optical axis misalignment. Since this relationship can be measured in advance, optical axis misalignment at arbitrary zoom positions can be corrected by storing the correspondence relationship of zoom positions with optical axis misalignment or read positions for correcting optical axis misalignment. However, the amount of data would be enormous if amounts of optical axis misalignment or read positions for correcting optical axis misalignment were provided for all zoom positions. In order to reduce the amount of memory used for saving data related to optical axis misalignment correction, the correspondence relationship between zoom positions and read positions (correction amounts) for correcting optical axis misalignment can be stored for discrete zoom positions, as shown in FIG. 4B, for example. Correction amounts corresponding to other zoom positions can be derived by interpolating the stored values.

Because the read position can be changed in units of one pixel or less with the memory read control unit 105 of the present embodiment as mentioned above, the read position can be changed smoothly. Thus, even in the case where clipped images are continuously displayed on an EVF or recorded as a moving image, for example, change in the read position is not readily noticeable. Note that although the correction amount relative to arbitrary zoom positions is derived by linearly interpolating discrete correction amounts in the present embodiment, other arbitrary methods can be used. For example, interpolation may be performed so that fitting is performed more smoothly using a polynomial. Movement of the center position of an image when a zoom operation is performed can be corrected by computing a read position that depends on the zoom position and setting the resultant value in the memory read control unit 105 as an offset value. In the present embodiment, however, the read position derived by that optical axis misalignment correction unit 110 is the target value, and the read position that is ultimately set in the memory read control unit 105 is decided by the read position control unit 111. Note that although FIG. 4A and FIG. 4B illustrate only horizontal optical axis misalignment and readout positions, correction of vertical optical axis misalignment can also be perform with similar processing.

Processing for Deciding Read Position

Figure 5:
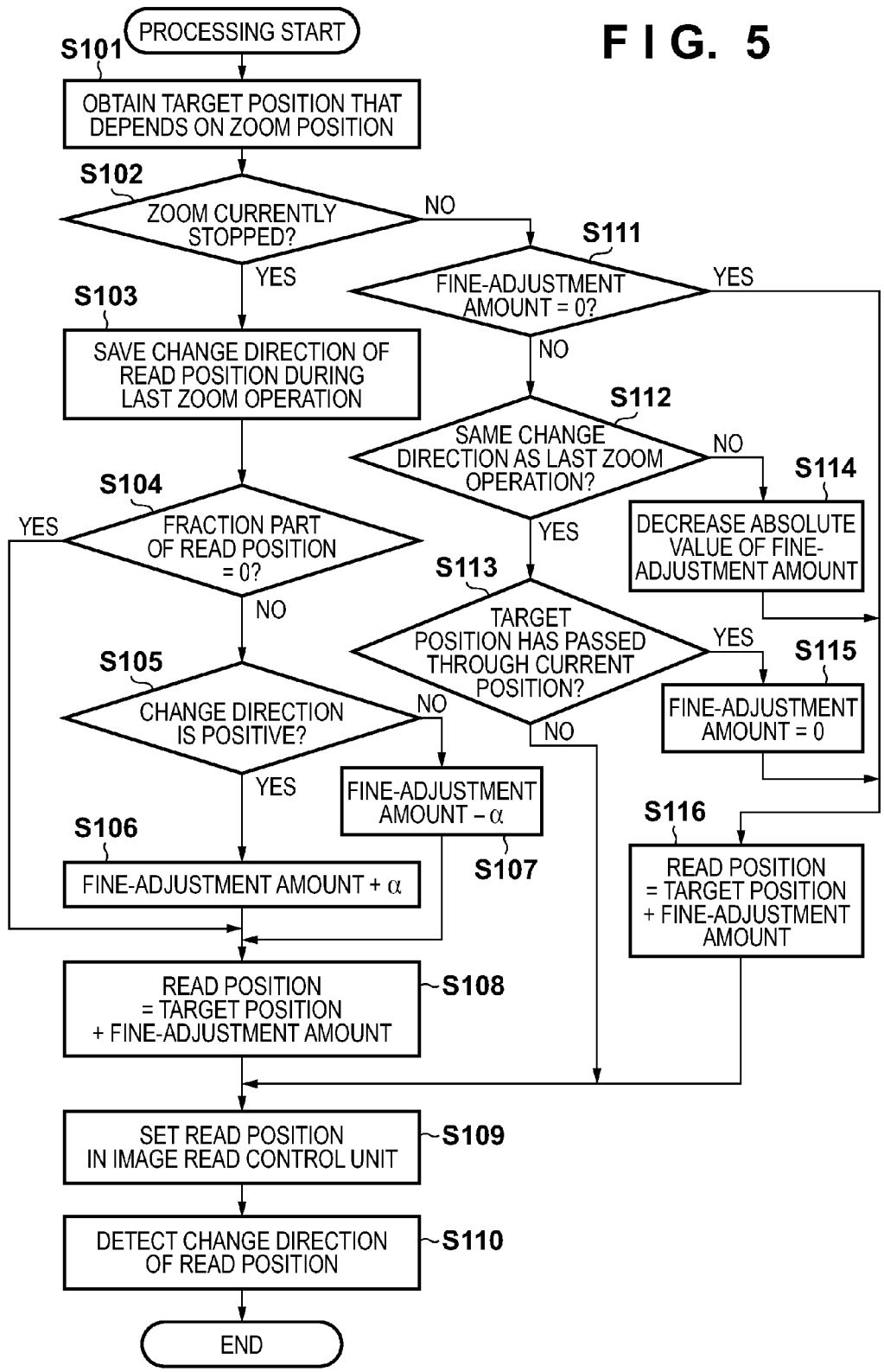
FIG. 5 is a flowchart showing the exemplary processing for deciding a read position in the first embodiment.

Next, a processing operation for controlling the read position that is performed by the read position control unit 111 will be described with reference to the flowchart in FIG. 5. The processing shown in FIG. 5 that is executed by the read position control unit 111 is performed in synchronization with the video frame rate, and is repeatedly executed in 16.67 ms cycles in the case of video in NTSC format, for example. Accordingly, even if the zoom magnification changes continuously during zoom operation, read positions that depend on the zoom magnification at the time of execution can be decided, and sequentially set in the memory read control unit 105.

First, in S101, the read position control unit 111 obtains a read position (target position) for correcting optical axis misalignment that depends on the zoom position, computed by the optical axis misalignment correction unit 110.

In S102, the read position control unit 111 determines through the control unit 106, for example, whether the zoom operation of the imaging optical system 101 is currently stopped. The read position control unit 111 may perform this determination directly from the output of the encoder 109. The read position control unit 111 advances the processing to S103 if it is determined that zooming is currently stopped, and advances the processing to S111 if it is determined that zoom is currently operating.

In S103, the read position control unit 111 saves information indicating the direction of change in the read position of the last zoom operation (increasing (positive) direction or decreasing (negative) direction separately for the horizontal direction and the vertical direction) in memory in the read position control unit 111, for example. The amount of change may also be saved.

In S104, the read position control unit 111 determines whether the fractional part of the read position that is currently set is 0, that is, whether interpolation is required in image generation of the current read region. If it is determined that the fractional part of the read position is 0, the read position control unit 111 calculates the final read position at S108. In this case, since the read position (target position+fine adjustment amount) that is currently set is an integer multiple of one pixel, the current read position is derived as the final read position.

On the other hand, if it is determined in S104 that the fractional part of the read position is not 0, the read position control unit 111, at S105, determines whether the direction of change in the read position during the last zoom operation saved at S103 was in the positive direction.

If it is determined that the direction of change was the positive (increasing) direction, the read position control unit 111, at S106, increases the fine-adjustment amount by a prescribed step a and advances the processing to S108. If it is determined in S105 that the direction of change is in the negative (decreasing) direction, the read position control unit 111, at S107, decreases the fine-adjustment amount by the prescribed step a and advances the processing to S108.

In S108, the read position control unit 111 adds the fine-adjustment amount computed at S106 or S107 to the target position obtained at S101 and derives the final read position.

In S109, the read position control unit 111 sets the integer part of the horizontal coordinates of the computed final read position as the H direction offset 202 and the integer part of vertical coordinates as the V direction offset 203 in the memory read control unit 105. Also, the read position control unit 111 sets the fractional part of vertical coordinates as the coefficient Vk of the multiplier 206 and the multiplier 208 and the fractional part of horizontal coordinates as the coefficient Hk of the multiplier 210 and the multiplier 212 in the memory read control unit 105.

In S110, the read position control unit 111 detects the direction of change in the read position from the read position set last time and the read position set this time. The amount of change in the read position may also be detected.

The processing from S104 to S108 is processing for moving the read position gradually to a read position that is an integer multiple of one pixel in accordance with the direction of change during zooming, in the case where the read position is less than one pixel at the time when zooming stopped.

That is, because the target position output by the optical axis misalignment correction unit 110 does not change while zooming has stopped, the read position is moved by applying a fine-adjustment amount to the target position in the case where the fractional part of the target position is not 0, so that the fractional part of the read position will approach 0. Although the read position may be moved at one time to the nearest read position that is in coordinate units in the direction of change in the read position according to the zoom direction before zooming stopped, movement of the image when zooming stops is likely to be noticeable in the case where the amount of movement is significant. Thus, in the present embodiment, the read position is changed so that the fractional part of the read position gradually approaches 0, with step α as the unit of movement. Note that the effect of suppressing the fall in sharpness of an image at the time when zooming stops can be obtained, even if the fractional part of the read position does not gradually approach zero, or the read position is moved in the opposite direction to the direction of change in the read position immediately prior to zoom being stopped.

Next, processing in the case where it is determined in S102 that zoom is operating will be described. In S111, the read position control unit 111 determines whether the current fine-adjustment amount is 0. If it is determined to be 0, the read position control unit 111, at S116, derives the final read position. The final read position is derived by adding the fine-adjustment amount to the target position obtained at S101, similarly to S108. Accordingly, if the fine-adjustment amount is 0, the target position obtained from the optical axis misalignment correction unit 110 is directly derived as the final read position.

It is determined in S111 that the fine-adjustment amount is not 0 in the case where the zoom operation is resumed in a state where the read position has been changed by the fine-adjustment amount due to the fractional part of the read position at the zoom stop position not being 0. In this case, the read position control unit 111, at S112, determines whether the direction of change has switched, by comparing the direction of change in the read position during the last zoom operation saved at S103 and the current direction of change.

If it is determined that the direction of change has switched (i.e., that a zoom operation in the opposite direction to before zoom was stopped has been started), the read position control unit 111, at S113, decreases the absolute value of the current fine-adjustment amount by a prescribed value, so that the fine-adjustment amount gradually approaches 0. On the other hand, if it is determined in S112 that the direction of change in the read position is the same, this indicates that a zoom operation in the same direction as before zoom was stopped has been started. In this case, the read position control unit 111, at S114, determines whether the target position obtained from the optical axis misalignment correction unit 110 has passed through the current position (current read position). Assuming that the target position is (x0, y0) and the current position is (x1, y1), this determination is executed by discriminating whether x0>x1 or y0>y1 in the case where the direction of change in the read direction is positive, and whether x0<x1 or y0<y1 in the case where the direction of change in the read direction is negative.

If the target position has not passed through the current position, this indicates that the current target position exists between the target position at the time when zooming stopped and the read position moved to as a result of the adjustment amount. Thus, if it is determined that the target position has not passed through the current position, the read position control unit 111 maintains the current read position moved to as a result of the adjustment amount, without updating the read position, and sets this position in the memory read control unit 105 at S109.

On the other hand, if it is determined at S114 that the target position has passed through the current position, the read position control unit 111, at S115, sets the fine-adjustment amount to 0. The target position obtained from the optical axis misalignment correction unit 110 can thereby be directly derived as the final read position at S116.

Next, changing of the read position in the imaging apparatus of the present embodiment will be described with reference to FIGS. 6A to 6C. FIGS. 6A to 6C show changes in the target position and the final read position in the case where zoom operation is started from time T0, zoom operation is temporality stopped at time T1, and zoom operation is started again at time T2. Also, the amount of optical axis misalignment correction relative to the zoom position is assumed to be greater for the wide-angle end than for the telephoto end, as shown in FIG. 4B.

First, FIG. 6A represents changing of the target position computed in the optical axis misalignment correction unit 110. Because the zoom position changes continuously toward the telephoto side from the wide angle side from time T0 to time T1, the required correction amount also decreases continuously, and the coordinate values of the read position that are set sequentially also decrease. Also, since the correction amount is derived in units of less than one pixel, the read position also changes smoothly in units of less than one pixel.

When the zoom operation stops at time T1, the optical axis misalignment correction unit 110 continues to output the target position that corresponds to the position at which zooming stopped. When the zoom operation resumes at time T2 and the zoom position continuously changes further toward the telephoto side, the correction amount and the coordinate values of the read position continuously decrease toward time T3 from time T2, similarly to from time T0 to time T1.

When target position is set in the memory read control unit 105 in the case where the fractional part of the correction amount corresponding to the zoom position at time T1 when the zoom operation stopped is not 0, as shown in FIG. 6A, an interpolated clipped image is output until time T2 when the zoom operation resumes, resulting in a drop in sharpness.

FIG. 6B shows processing performed by the read position control unit 111 of the present embodiment in order to avoid such a problem. Between time T0 and time T1, a target position 601 computed by the optical axis misalignment correction unit 110 is set in the memory read control unit 105 as the final read position, similarly to FIG. 6A.

The fractional part of a read position (correction amount) n' that is set at the time when the zoom operation stopped at time T1 is not 0. In this case, the read position control unit 111 moves the read position in the same direction as during the last zoom operation from the target position at time T1 when the zoom operation stopped to the next read position n at which the fractional part is 0. This movement is carried out by setting a read position obtained by correcting the target position by a fine-adjustment amount in the memory read control unit 105. In FIG. 6B, the target position 601 equals a read position 602 till time T1, but even though the target position 601 does not change from time T1, the read position 602 continues to move in the case where the fractional part of the target position at time T1 is not 0.

Since the direction of change in the read position or the correction amount until immediately before time T1 is in the negative direction in the case of FIG. 6B, a negative fine-adjustment amount is applied so that the target position is further decreased. In S107, the absolute value of a fine-adjustment amount 603 is gradually increased with step a as the unit, and the read position is moved in the direction of change from the target position n' at time T1 (zoom stop position) to the next read position n at which the fractional part is 0. This is equivalent to repeating the processing in the order S104, S105, S107 and S108 in FIG. 5. Once the read position reaches the read position n that is an integer multiple of one pixel at time T4, the fine-adjustment amount is maintained (S104→S108 in FIG. 5).

In this way, movement of the read position while zooming has stopped is controlled so as to gradually move from the current read position to the read position n that is an integer multiple of one pixel in the same direction as the direction of change in the read position during the immediately prior zoom operation, that is, in the negative direction. This movement from n' to n is realized by gradually increasing the absolute value of the above-mentioned fine-adjustment amount from 0 with step α as the unit. The value of step α can be set so that the difference between the rate of change of the correction amount in the immediately prior zoom operation and the rate of change when changing the correction amount from n' to n is not significant. For example, assuming that the correction amount when zooming is started is n", α can be decided as the nearest value divisible by (n'−n)/α, based on α=(n"−n')/(T1−T0).

When the zoom operation resumes at time T2, the target position 601 changes according to the change in zoom position. However, because the direction of change in the read position in the zoom operation after resumption is the same as the direction of change in the read position of the last zoom operation, control is performed so as to not change the read position until the target position 601 passes through the current read position n. This is equivalent to processing in the order S111, S112, S113 and S109 in FIG. 5. Accordingly, the current read position n is held from time T2 at which the zoom operation is resumed until time T5 at which the target position 601 equals the current read position n. When time T5 arrives and the target position 601 passes through the current read position, the fine-adjustment amount will be 0 and thereafter the target position 601 will equal the read position 602.

FIG. 6C shows exemplary control by the read position control unit 111 in case where the zoom operation resumed at time T2 is a zoom operation from the telephoto side to the wide angle side in the opposite direction to before zoom was stopped. Since from time T0 to time T2 is similar to FIG. 6B, description is omitted.

When the zoom operation is started toward the wide angle side from the telephoto side at time T2, the coordinate values of the target position 601 change in the increasing direction. In this case, the read position that has been moved while zoom was stopped needs to be quickly returned the target position. This can be achieved by setting the fine-adjustment amount to 0. However, movement of the image may be noticeable in the case where the fine-adjustment amount is immediately set to 0. Thus, in the present embodiment, the absolute value of the fine-adjustment amount is gradually decreased. This processing is equivalent to processing in the order S111, S112, S114, S116 and S109 in FIG. 5. In the example in FIG. 6C, the absolute value of the fine-adjustment amount is gradually decreased from time T2 to time T6, narrowing the difference between the read position and the target position. The fine-adjustment amount is set to 0 at time T6, and thereafter the target position 601 equals the read position 602.

Note that the units by which the fine-adjustment amount is decreased at S114 can be set to a high value within a range in which movement of the image is not noticeable, and specific values can be derived through experimentation, for example. Also, the value may be changed according to the speed of the zoom operation (rate of change of the target position).

Note that in FIGS. 6A to 6C, in order to facilitate understanding and description, either the horizontal direction or the vertical direction was described, but similar control can be performed for the other direction.

According to the present embodiment as described above, it is possible to change the read position smoothly, so that the change in the read position for correcting optical axis misalignment is not noticeable, by deriving a read position that depends on the zoom position in units smaller than one pixel, during the zoom operation of the imaging optical system. Also, because the read position is moved to a read position in the units in which pixels are read from the image sensor, in the case where the read position at the time when the zoom operation has stopped is not an integer multiple of one pixel, a drop in the resolution of image signals output at the time when zooming has stopped can be prevented.

Also, since the read position is moved in a direction equal to the direction of change in the read position of the immediately prior zoom operation in the case where the read position is moved at the time when zooming has stopped, unnatural unstableness and fluctuation of the captured image can be prevented. In this way, it is possible to realize control of the read position that achieves both a smooth change in the read position during zoom operation and a feeling of sharpness when not zooming.

Second Embodiment

Next, a second embodiment will be described. An imaging apparatus according to the present embodiment has an electronic camera shake correction function for electrically correcting blurring of a captured image by detecting shake of the main body of the imaging apparatus using an angular velocity sensor and moving the read position of the captured image according to the detected shake.

FIG. 7 is a block diagram showing an exemplary configuration of a digital camcorder 200 serving as an example of the imaging apparatus according to the present embodiment. In FIG. 7, the same reference signs are given to configuration that is the same as the digital camcorder 100 according to the first embodiment, and detailed description is omitted.

The digital camcorder 200 of the present embodiment is provided with a blur correction control unit 114 that computes the read position of an image based on a shake signal obtained from an angular velocity sensor 112. A read position obtained by adding the read position computed by the blur correction control unit 114 and the read position decided by the read position control unit 111 is then set in the memory read control unit 105.

The angular velocity sensor 112 detects the shake applied to the digital camcorder 200, and converts the detected shake into an electric signal. An amplifier 113 amplifies the output of the angular velocity sensor 112 to an optimal sensitivity, and supplies the amplified output to the blur correction control unit 114. The blur correction control unit 114 has a built-in A/D convertor for converting the output of the amplifier 113 into a digital signal, and computes an angular displacement by integrating detected angular velocities (output of the amplifier 113). The blur correction control unit 114 derives the amount and direction of pixel movement on the image sensor produced by shake, from the obtained angular displacement, that is, a shake angle θ of the imaging apparatus, a focal length f of an imaging optical system 101, and a pixel pitch m of an image sensor provided in an imaging unit 102, and decides the read position.

Electronic Camera Shake Correction Processing

Figure 8:
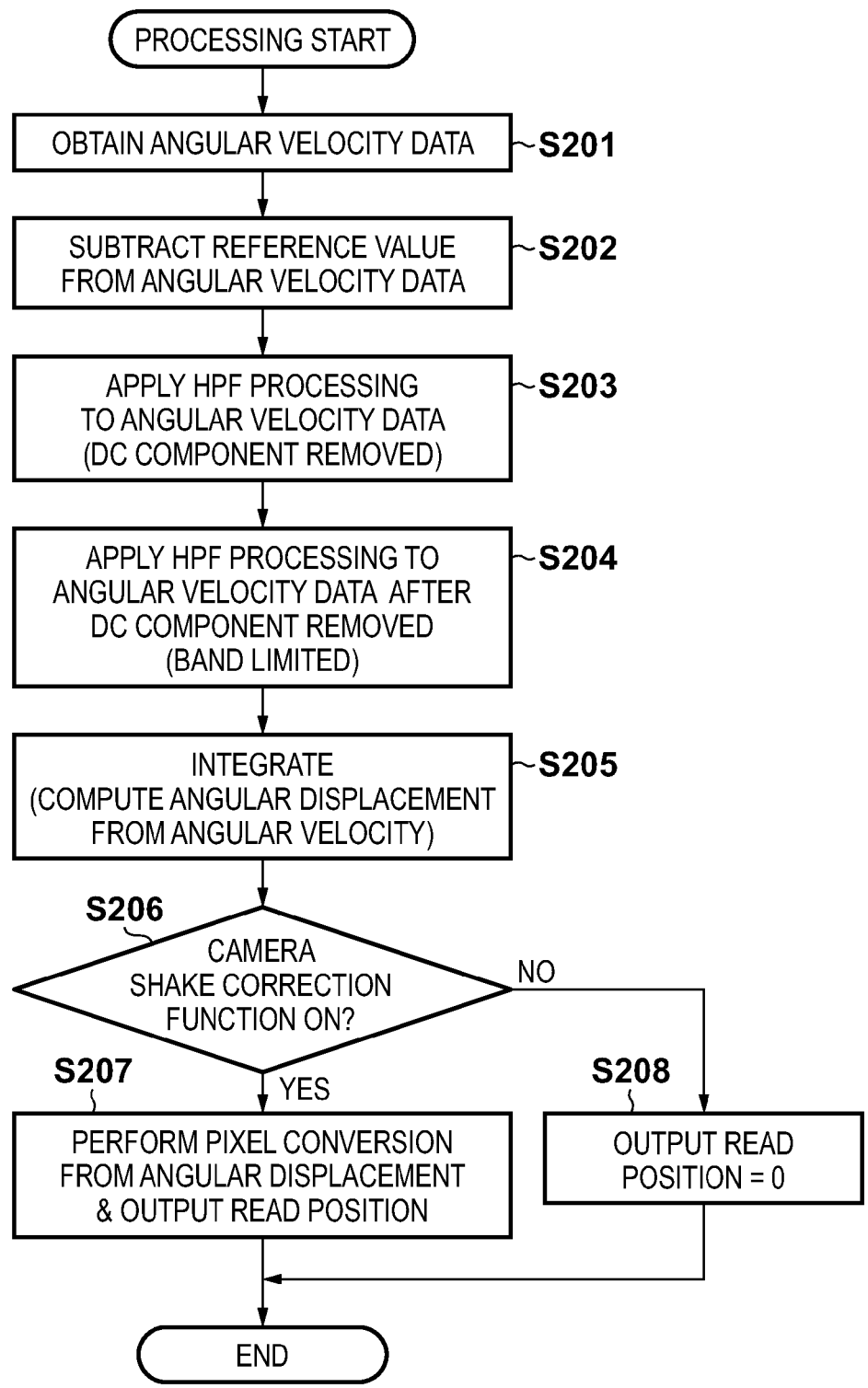
FIG. 8 is a flowchart illustrating camera shake correction processing performed by a blur correction control unit in FIG. 7.

FIG. 8 is a flowchart illustrating camera shake correction (read position computation) processing performed by the blur correction control unit 114. The processing shown in FIG. 8 is performed in synchronization with the frame rate of video, and is repeatedly executed in 16.67 ms cycles if the video is in NTSC format, for example.

First, in S201, the blur correction control unit 114 obtains angular velocity data from the amplifier 113, and converts the obtained data into a digital signal with the built-in A/D convertor. In S202, the blur correction control unit 114 subtracts a reference value, which is the output of the angular velocity sensor when there is no shake, from the obtained angular velocity data. Following this processing, the angular velocity data will be 0 when there is no shake, and is processed as a value having a sign centered on 0.

In S203, the blur correction control unit 114 applies HPF processing to the angular velocity data, and removes the DC component of the angular velocity data. In S204, the blur correction control unit 114 further applies HPF processing to the angular velocity data after the DC component has been removed, and limits the frequency band of the shake component targeted for blur correction. A cutoff frequency fc of the HPF used for this band limitation is assumed to be variable.

In S205, the blur correction control unit 114 computes angular displacement data by integrating the band-limited angular velocity data. The angular displacement obtained here will, in other words, be the shake angle θ of the imaging apparatus. In S206, the blur correction control unit 114 determines whether the camera shake correction function has been activated (set to ON) by a user operation. If the camera shake correction function is ON, the blur correction control unit 114, at S207, computes the read position of the image using angular displacement data. The read position is computed so as to offset the movement of the image on the image sensor produced by the shake of the digital camcorder 200. Here, the amount and direction of movement of the pixels can be computed as f×tan θ/m, where θ is the shake angle of the digital camcorder 200 derived at S205, f is the focal length of the imaging optical system 101, and m is the pixel pitch of the image sensor. Accordingly, the read position can be updated by reflecting the amount and direction of movement of the pixels in the read position derived last time.

When it is determined in S206 that the camera shake correction function is not ON, the processing is advanced to S208, and the read position for correcting shake is set to 0 (0, 0). The blur correction control unit 114 outputs 0 when shake is not detected.

Returning to FIG. 7, the adder 115 adds the output of the blur correction control unit 114 and the output of the read position control unit 111, and supplies the resultant value to the memory read control unit 105. As a result of the output of the adder 115, the read position is changed according to the shake, with the read position computed by the read position control unit 111 as a reference position. In this way, blurring of an image is electrically corrected by changing the read position of the memory read control unit 105 so as to read out an image signal from the corresponding region of the image sensor, so as to offset pixel movement produced by shake. Because the blur correction control unit 114 outputs 0 when the camera shake function has been turned off by a user operation, the output of the read position control unit 111 is supplied directly to the memory read control unit 105. In this way, the digital camcorder 200 of the present embodiment is able to correct blurring of an image by changing the read position of an image, when the camera shake correction function is ON. Also, when the camera shake correction function is OFF, control of the read position that achieves both a smooth change in the read position during zoom operation and a feeling of sharpness when not zooming can be realized.

Although the embodiments of the present invention were described taking a digital camcorder with a fixed lens as an example, the imaging apparatus may be a camera with an interchangeable lens. At this time, detection of zoom operation and zoom position is performed on the interchangeable lens side, and the detection result is used on the main body (imaging apparatus) side.

OTHER EMBODIMENTS

Aspects of the present disclosure can also be realized by a computer of a system or apparatus (or devices such as a CPU or MPU) that reads out and executes a program recorded on a storage device to perform the functions of the above-described embodiment(s), and by a method, the steps of which are performed by a computer of a system or apparatus by, for example, reading out and executing a program recorded on a storage device to perform the functions of the above-described embodiment(s). For this purpose, the program is provided to the computer for example via a network or from a recording medium of various types serving as the storage device (e.g., computer-readable medium).

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-286632, filed on Dec. 27, 2011, which is hereby incorporated by reference herein in its entirety.

What is claimed is:

1. An image processing apparatus comprising:
an obtaining unit that obtains a captured image formed by an imaging optical system having a variable zoom ratio;
an image sensing unit that generates an image of predetermined size from a preset read range of the captured image;
a calculating unit that calculates a region in which the read range is movable or a center position of the region in which the read range is movable, according to a zoom operation of the imaging optical system; and
a setting unit that sets the region or the center position calculated by the calculating unit in units of less than one pixel during a zoom operation of the imaging optical system and sets the region or the center position in integer multiples of one pixel when the zoom operation has stopped.

2. The image processing apparatus according to the claim 1,
wherein the setting unit, when the zoom operation has stopped, sets the region or the center position calculated by the calculating unit to a nearest read position that is an integer multiple of one pixel to the region or the center position calculated by the calculating unit that corresponds to a zoom position at which the zoom operation stopped, in case that the region or the center position calculated by the calculating unit that is decided to correspond to a zoom ratio at a time when the zoom operation stopped is a unit of less than one pixel.

3. The image processing apparatus according to the claim 1,
wherein the setting unit, when the zoom operation has stopped, sets the center position of the read range to a nearest position that is an integer multiple of one pixel in a zoom direction immediately before the zoom operation stops to the center position of the read range corresponding to a zoom position at which the zoom operation stopped, in case that the center position of the read range decided to correspond to a zoom ratio at a time when the zoom operation stopped is a unit of less than one pixel.

4. The image processing apparatus according to the claim 1,
wherein the setting unit, when the zoom operation has resumed after stopping, does not change the region or the center position calculated by the calculating unit until a read position corresponding to a zoom position reaches a current read position, if the zoom operation before stopping and the resumed zoom operation are in the same direction.

5. The image processing apparatus according to the claim 1,
wherein the setting unit, when the zoom operation has resumed after stopping, sets the region or the central position calculated by the calculating unit so that a current read position gradually approaches a read position corresponding to a zoom ratio of the resumed zoom operation, if the zoom operation before stopping and the resumed zoom operation are in opposite directions.

6. An imaging apparatus comprising:
an imaging optical system having a variable zoom ratio;
an imaging unit that obtains a captured image composed of a plurality of pixels that is obtained by capturing an optical image formed by the imaging optical system; and
the image processing apparatus according to claim 1.

7. The imaging apparatus according to claim 6, further comprising:
a detecting unit that detects shake of the imaging apparatus;
a blur correcting unit that computes a read position of the captured image for correcting shake detected by the detecting unit; and
an adding unit that adds the read position computed by the blur correcting unit to a read position decided by a control unit, and supplies a resultant value to the image sensing unit.

8. A non-transitory computer readable recording medium storing a program for causing a computer to function as the image processing apparatus according to claim 1.

9. The image processing apparatus according to claim 1, wherein there is a misalignment between an optical axis of the imaging optical system and a center position of the image sensor.

10. The image processing apparatus according to claim 9, wherein a difference between the center position of the image sensor and a center position of the region in which the read range is movable, when the imaging optical system has a first angle of view, is larger than the difference when the imaging optical system has a second angle of view narrower than the first angle of view.

11. A control method of an image processing apparatus comprising:
an obtaining step of obtaining a captured image formed by an imaging optical system having a variable zoom ratio;
an image sensing step of generating an image of predetermined size from a preset read range of the captured image;
a calculation step of calculating a region in which the read range is movable or a center position of the region in which the read range is movable, according to a zoom operation of the imaging optical system; and
a setting step of setting the region or the center position calculated by the calculating step in units of less than one pixel during a zoom operation of the imaging optical system and setting the region or the center position in integer multiples of one pixel when the zoom operation has stopped.

* * * * *